Jan. 30, 1951   C. B. PIERCE   2,539,924
UPPER CYLINDER LUBRICATOR
Filed Jan. 14, 1947
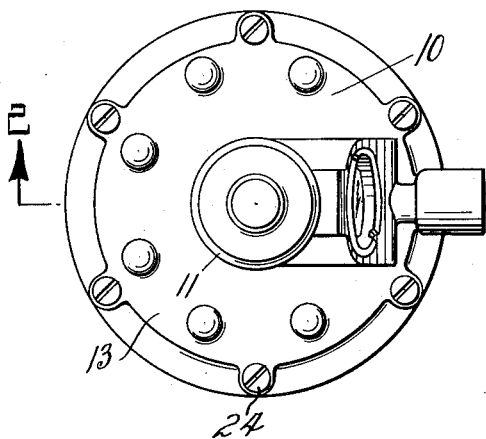
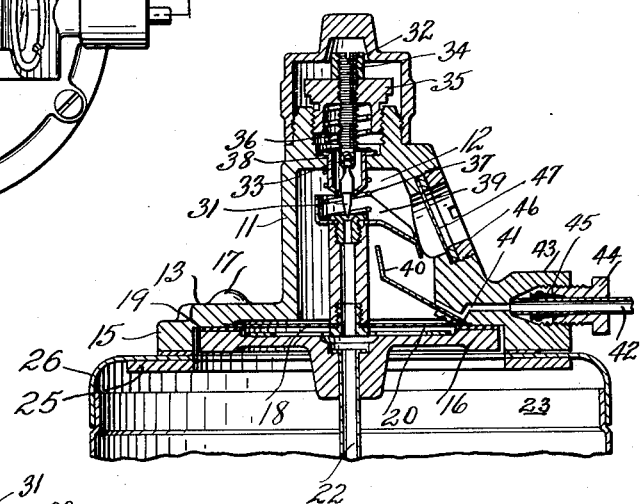
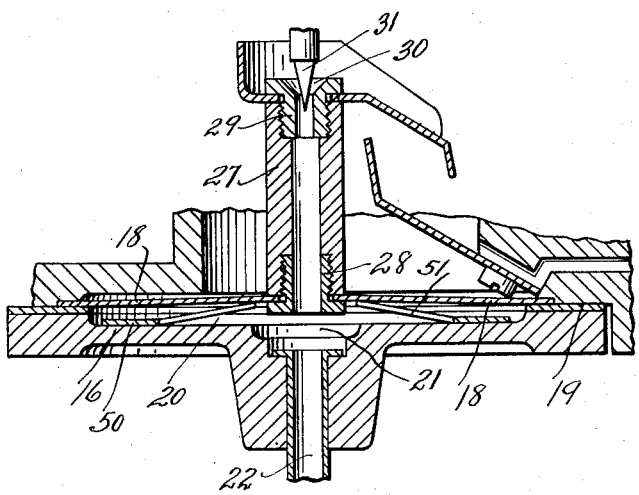
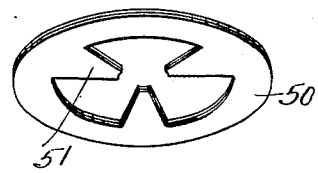
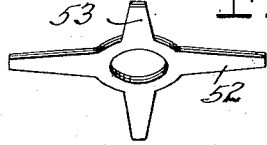
INVENTOR
Clayton B. Pierce
BY
S. Stephen Baker
ATTORNEY Patented Jan. 30, 1951

2,539,924

UNITED STATES PATENT OFFICE 2,539,924

UPPER CYLINDER LUBRICATOR

Clayton B. Pierce, New York, N. Y., assignor to Emerol Manufacturing Co., Inc., New York, N. Y., a corporation of Illinois Application January 14, 1947, Serial No. 721,929

5 Claims. (Cl. 123—196)

This invention relates to a lubricating system and more particularly to a device for introducing lubricant material into the combustion chambers of an internal combustion engine or the like in accordance with the requirements of the engine.

The invention is an improvement on lubricating systems of the type shown in U. S. Patent No. 1,883,110. As disclosed in this patent, lubricating systems of this nature include the provision of a movable diaphragm which is acted upon by vacuum existing in the manifold of the internal combustion engine so as to adjust the opening of a needle valve and to control accordingly the quantity of lubricant delivered to the combustion chambers of the engine through the valve opening. The device is arranged to thereby increase the effective size of the valve opening when the engine is running at a high speed so as to correspondingly increase the passage of lubricant to the engine. Conversely, the effective valve opening is decreased when the engine is idling and the passage of lubricant being delivered is limited accordingly. Thus, the system serves to supply an amount of lubricant governed by the speed of the engine.

It has been found that under certain conditions, the system does not operate as intended in that a greater delivery of lubricant than necessary is effected when the engine has been running for some time. A disadvantage of such irregularity of operation is that the lubricant supply is exhausted sooner than warranted and the operator is occasioned loss of time as well as expense in replenishing the supply or, failing this, the engine is subject to damage after the supply is prematurely exhausted.

A most important aspect of the present invention is based upon a finding that the excessive delivery of lubricant is attributable principally to a decrease in its viscosity produced, generally, during the operation of the engine. It will be evident that a valve opening which is regulated or adjusted to admit a controlled amount of lubricant of a particular viscosity, will admit a much greater amount if the viscosity of the lubricant is decreased. Bearing the foregoing in mind, therefore, it is an object of the instant invention to provide means which will control the size of the valve opening not only in accordance with the speed or vacuum conditions of the engine but in consideration of a change in the viscosity of the lubricant as above mentioned.

Another object of this invention is to provide such a lubricating system wherein the amount of lubricant delivered is correctly regulated notwithstanding gradual changes in viscosity of the lubricant produced by heat variations, and in a simple, economical manner requiring no modifications in the design of systems in current use.

Still another object of this invention is to provide a more stable lubricating device of greater precision and efficiency in operation and which will require a minimum of maintenance during the life thereof.

Other objects of my invention will be apparent from the following description, it being understood that the above general statements of the objects of my invention are intended to describe and not limit it in any manner.

Referring to the drawings herein:

Fig. 1 is a top plan view of a lubricating device utilized for practicing the instant invention.

Fig. 2 is a vertical section along the lines 2—2 of Fig. 1 and illustrating the connection of the device to a lubricant reservoir or source of supply.

Fig. 3 is an enlarged fragmentary view of the device as shown in Fig. 2.

Fig. 4 is a perspective view of a heat responsive member which is disposed in the device of the instant invention.

Fig. 5 is a view similar to Fig. 4 but illustrating a modification thereof.

The device comprises a casing or housing 10 having a substantially tubular wall 11 defining a chamber 12. Wall 11 is formed with an integral, perpendicular wall 13 which is formed with a depending flange 15. Flange 15 is adapted to embrace an enclosing base member 16 which is secured therein by screws, not shown, which are receivable into the domelike nuts 17. Secured between the marginal edge of base member 16 and wall 13 is a circular diaphragm 18 tightly maintained between said members at its marginal edge by a gasket 19. Base member 16 is formed with a central depression to form a narrow chamber 20 on the underside of the diaphragm 18. Thus, diaphragm 18 operates between the chambers 12 and 20 as hereinafter described.

An opening 21 is formed centrally of base member 16 and is adapted to receive a conduit 22 which communicates with the lubricant source of supply maintained within can or reservoir 23. Wall 13 may be secured at its flange 15 by screws 24 to a reinforcing ring 25 within reservoir 23 although any equivalent means may obviously be utilized such as by providing suitable threaded openings within the cover 26 of reservoir 23.

As will be hereinafter described, diaphragm 18 is adapted to be acted upon by suction conditions of an internal combustion engine to which the device is applied so as to control the size of a valve opening through which the lubricant passes to the engine. Thus, diaphragm 18 is connected to hollow stem 27 as by the hollow brass nut 28. Screwed into the upper end of stem 27 is a nut 29 providing a valve seat 30. Valve seat 30 is adapted to cooperate with a needle valve 31 in order to determine the size of the valve opening, as will be evident.

Means are provided to determine the relationship of needle valve 31 with its valve seat 30. Such means comprise a screw 32 supporting the valve 31 through a knuckle joint 33. Screw 32 is threadedly received within the nuts 34 and 35, nut 35 serving as an adjusting dial for indicating the longitudinal position of needle valve 31 and consequently supplying information as to the size of the valve opening. Nut 34 is not calibrated as is nut 35 but it serves primarily as a factory adjustment to insure the accuracy of the calibrations on nut 35. It will be evident that rotating either screw 32 or nut 35 will vary the longitudinal position of valve 31 accordingly. A coil spring 36 disposed within a hollow of nut 35 serves to maintain the parts in correct and firm relationship while a coil spring 37 stabilizes the valve enclosing cup 38 against the feed spoon 39 and maintains the stem 27 against excessive lateral movement.

Feed spoon 39 is adapted to receive the lubricant as it emerges from the valve seat 30 and permits the lubricant to drip onto the pan 40. The lubricant thereafter is drawn through the orifice 41 into the conduit 42 which is maintained within the internally threaded nipple 43 by the coupling 44, a circular grommet or gasket 45 serving to provide a secure connection. A ring screw 46 provided with a window 47 provides visual communication with the chamber 12 so that the amount of lubricant dripping from spoon 39 onto pan 40 may be observed. Thus, the adjusting means provided by nuts 34 and 35 may be actuated pursuant to the observed flow of lubricant during the operation of the engine.

The other end of conduit 42 extends through a suitable opening formed in the intake manifold of the engine between the intake valves and the throttle valve of the charge forming device in the engine. In this manner, the upper chamber 12 is subjected to the suction of the engine so as to actuate the flexible diaphragm 18, such actuation taking place between the upper or extended chamber 12 and the relatively shallow chamber 20. It will be recognized that as the diaphragm is drawn towards the needle valve 31, the size of the valve opening decreases to reduce the amount of lubricant drawn from the source of supply to the combustion chambers and valves of the engine. The operation of the device is such as to produce a larger opening of the valve means when the engine is operating at high speed conditions and reduce the size of the opening during low speed operation.

The above device represents a mechanical improvement over that illustrated in the above mentioned patent, but its mode of operation is generally the same. While such operation has been substantially as intended, it has been found that under certain conditions the amount of lubricant drawn from the source of supply did not correspond to the actual operating conditions of the engine. As recited above, this was found to be attributable to a variation in the viscosity of the lubricant produced by the ambient heat conditions. It will be evident that a valve opening suitable for a fluid lubricant of a particular viscosity is too large when the viscosity of the lubricant is decreased. The instant invention compensates for such a condition by further acting upon the diaphragm 18 independently of the suction conditions but pursuant to the heat conditions. Thus, the joint action of heat responsive means and the suction conditions of the engine are employed to adjust the lubricant valve opening.

Such heat responsive means takes the form of a planar, bi-metallic member 50 which is inserted in the chamber 20 of base member 16 so as to be substantially co-planar with, and disposed adjacent to, the diaphragm 18. The material of which member 50 is fabricated is well known in the art.

Member 50 is formed with fingers 51 which, by virtue of their bi-metallic, heat responsive character, rise or fall under the influence of such heat. The normal condition of member 50 is planar throughout, but when subjected to heat, the fingers will rise.

The action of member 50 is illustrated in Fig. 3 wherein the fingers 51 have risen so as to bear against the diaphragm 18. Accordingly, the diaphragm is physically raised whereupon the valve seat 30 is brought closer to the needle valve 31 so as to reduce the effective size of the valve opening. It will be apparent that when the engine is operating at high speed condition, the reduced suction would ordinarily cause the diaphragm 18 to return to its normal flat state wherein the valve opening is rendered sufficiently large to accommodate such speed. However, the position of fingers 51 in Fig. 3 indicates that a condition of heat exists which, as described above, affects the viscosity of the lubricant. The diaphragm 18 is thereby prevented from descending by the uplifted fingers 51 so as to maintain the effective valve opening within desired limits notwithstanding the tendency of the diaphragm to enlarge it. When the engine is cold, however, and under the same high speed conditions, the opening will be suitably enlarged, thus taking into account not only the operating speed conditions but the temperature which affects the lubricant.

Bi-metallic, heat resposive member 52, illustrated in Fig. 5, is substantially of the same construction as member 50. However, the fingers 53 are formed outwardly of said member 52 so that the compensating or auxiliary control pressure is exerted against the outer edges of the diaphragm 18 instead of adjacent to its center as in the previous embodiment.

Whereas members 50 and 52 have been described as being bi-metallic throughout, it is evident that only the finger portions thereof need be of such character since it is only the fingers which effect the desired heat control. In fact, the portions of members 50 and 52 other than the fingers may be bolted or otherwise held down within chamber 20 leaving the fingers free to operate. However, specific advantages accrue from the embodiments illustrated in that the assembly operations required in incorporating the heat responsive member of the instant invention in the system are practically negligible, it being only necessary to drop the heat responsive member into the chamber during assembly of the article. The heat responsive member may be similarly applied to a device constructed according to the above mentioned patent as well as to other devices, patents on which may be issued or pending, and which may represent prior developments hereof, by simply inserting the member into the lower chamber formed by the valve controlling diaphragm, such lower chamber being designated as 18 in the patent mentioned. However, in the instant device, the construction is of further advantage since the casing is adapted to be mounted upon the lubricant reservoir so as to be subject to its heat conditions. The flow is further more accurate and the stability of the parts superior because of the specific mechanical construction.

I have shown a preferred embodiment of my invention, but it is obvious that numerous changes and omissions may be made therefrom without departing from its spirit. For example, whereas the heat control member has been illustrated as acting directly upon the diaphragm, the reaction of a heat responsive member may be applied to the valve in many alternative ways as by acting against the underside of spoon 47 or by actuating the needle valve itself in the absence of a regulating screw such as screw 32. Furthermore, the heat responsive member may take forms other than that described. It is therefore desired that the invention be limited only as required by the scope of the appended claims.

I claim:

1. A device for feeding a lubricant from a source of supply thereof to the cylinders of an internal combustion engine, said device comprising a casing, valve means for regulating the rate of flow of said lubricant to said cylinders, a diaphragm connected to said valve means and moved by the suction created by the displacement of the pistons of said engine for automatically adjusting the opening of said valve means so as to draw said lubricant through said opening into said cylinders in an amount depending upon said suction, and auxiliary control means located in the environment of said lubricant source of supply so as to be exposed to substantially the same heat conditions thereof, said auxiliary means comprising a bi-metallic, heat responsive member whereby a heat produced reduction in viscosity of said lubricant produces a movement of auxiliary control means, said auxiliary control means being disposed within said casing and physically bearing against said diaphragm so as to cause a corresponding movement of said diaphragm in the same direction as the suction controlled movement of said auxiliary control means whereby the rate of flow of said lubricant is determined by said suction as modified by the action of said auxiliary control means.

2. A device according to claim 1 wherein said diaphragm is a planar member, said valve means including a valve and a valve seat, said diaphragm being connected to said valve seat, said auxiliary control means being co-planar with and disposed adjacent to said diaphragm, fingers formed on said auxiliary control means, said fingers being operative to rise or fall under the influence of heat conditions the rise thereof lifting said diaphragm so as to bring said valve seat closer to said valve and adjust the opening of said valve means.

3. A lubricating device for association with an internal combustion engine so as to lubricate the cylinders thereof during operation, said device comprising a reservoir provided with an opening in its top, a casing arranged over said opening, a flexible apertured diaphragm maintained within said casing so as to form superposed chambers, the upper of said chambers being extended and the lower of said chambers being relatively shallow, an inlet for the lower chamber, an outlet for the upper chamber, a hollow stem in said upper chamber and connected at a lower end thereof to said diaphragm so that the hollow of said stem communicates with the aperture of said diaphragm, the upper end of said stem forming a valve seat, a needle valve cooperating with said valve seat for regulating the flow of lubricant therethrough and a nut for varying the longitudinal position of the valve relative to said valve seat so as to adjust the valve opening, said aperture of the diaphragm and the hollow of the stem being operative to permit the passage of lubricant therethrough from said reservoir to the cylinders of said engine depending upon the size of said valve opening.

4. A device according to claim 3 and including spring means acting against said valve seat end of said hollow stem for stabilizing the cooperative action between said needle valve and said valve seat.

5. A device for feeding a lubricant from a source of supply thereof to the cylinders of an internal combustion engine, said device comprising a casing, valve means including a valve seat for regulating the rate of flow of said lubricant to said cylinders, a diaphragm connected to said valve seat and controlled by the suction created by the displacement of the pistons of said engine for automatically adjusting the opening of said valve means so as to draw said lubricant through said opening into said cylinders in an amount depending upon said suction, and auxiliary means located in the environment of said lubricant source of supply so as to be exposed to substantially the same heat conditions thereof, said auxiliary means being responsive to such heat conditions whereby a heat produced reduction in viscosity of said lubricant produces a movement of said auxiliary means, said auxiliary means being disposed in contacting relationship with said diaphragm whereby said movement is operative to actuate said diaphragm so as to further control said valve opening so that the rate of flow of said lubricant is determined by said suction as modified by the action of said auxiliary means.

CLAYTON B. PIERCE.

REFERENCES CITED

The following references are of record in the file of this patent:

UNITED STATES PATENTS

| Number | Name | Date |
|---|---|---|
| 1,883,110 | Thompson | Oct. 18, 1932 |
| 1,960,584 | Harris | May 29, 1934 |
| 1,991,722 | Berray | Feb. 19, 1935 |
| 2,085,974 | Harris | July 6, 1937 |